April 26, 1949. C. R. BERGER 2,468,539
CANDLE MOLDING APPARATUS

Filed Feb. 20, 1947 3 Sheets-Sheet 1

INVENTOR.
Carl R. Berger,
BY Morsell & Morsell
ATTORNEYS.

April 26, 1949. C. R. BERGER 2,468,539
CANDLE MOLDING APPARATUS
Filed Feb. 20, 1947 3 Sheets-Sheet 3

INVENTOR.
Carl R. Berger,
BY Morsell & Morsell
ATTORNEYS.

Patented Apr. 26, 1949

2,468,539

UNITED STATES PATENT OFFICE 2,468,539

CANDLE MOLDING APPARATUS

Carl R. Berger, Oshkosh, Wis.

Application February 20, 1947, Serial No. 729,723

3 Claims. (Cl. 18—27)

This invention relates to improvements in candle molding apparatuses.

A general object of the present invention is to provide an improved and highly efficient candle molding apparatus especially suited for large scale commercial operations and which will permit the simultaneous casting of a multiple number of candles having accurately centered wick bores therethrough.

Apparatuses have heretofore been available for casting a multiple number of candles, and in such apparatuses the molten wax is poured into the molds and sets about pins which form the central or axial wick bores in the completed candles. In the conventional molds the wick bore forming pins are fixed and the cast and hardened candles must be removed therefrom which is a difficult operation, ultimately resulting in bent or deflected pins which produce non-centered holes in the subsequently cast candles. With the above objections in mind, the primary object of the present invention is to provide a candle mold wherein a vertically reciprocatable table carries a plurality of pins, whereby raising or lowering of the table projects and retracts the pins relative to the centers of the molds, and as a consequence, after the wax has been cast in the molds about the projecting pins, the table may be lowered to retract the pins from the molds and formed candles, facilitating removal of the candles from the molds without damage to the pins and wick bores.

A further object of the invention is to provide a candle molding apparatus wherein the wick bore forming pins are all carried by a table which is susceptible of quick up and down movement through a simple manual manipulation.

A further object of the invention is to provide a candle molding apparatus wherein the wick bore forming pins may, during the candle casting operation, be raised and lowered to clear the wick holes in the formed candles, the arrangement being such that the candle wick bores are always centrally or axially located relative to the candles.

A further object of the invention is to provide a candle molding apparatus in which the mold plates or tables may be preliminarily heated, and subsequently cooled, and which is designed to facilitate the removal of the cast candles without damage thereto.

A further object of the invention is to provide a candle molding apparatus which is of very simple construction, which is strong and durable, which is easy to operate, which results in the formation of perfect candles, and which is well adapted for the purposes described.

With the above and other objects in view, the invention consists of the improved candle molding apparatus and its parts and combinations as set forth in the claims, and all equivalents thereof.

In the accompanying drawings in which the same reference characters indicate the same parts in all of the views.

Figure 1:
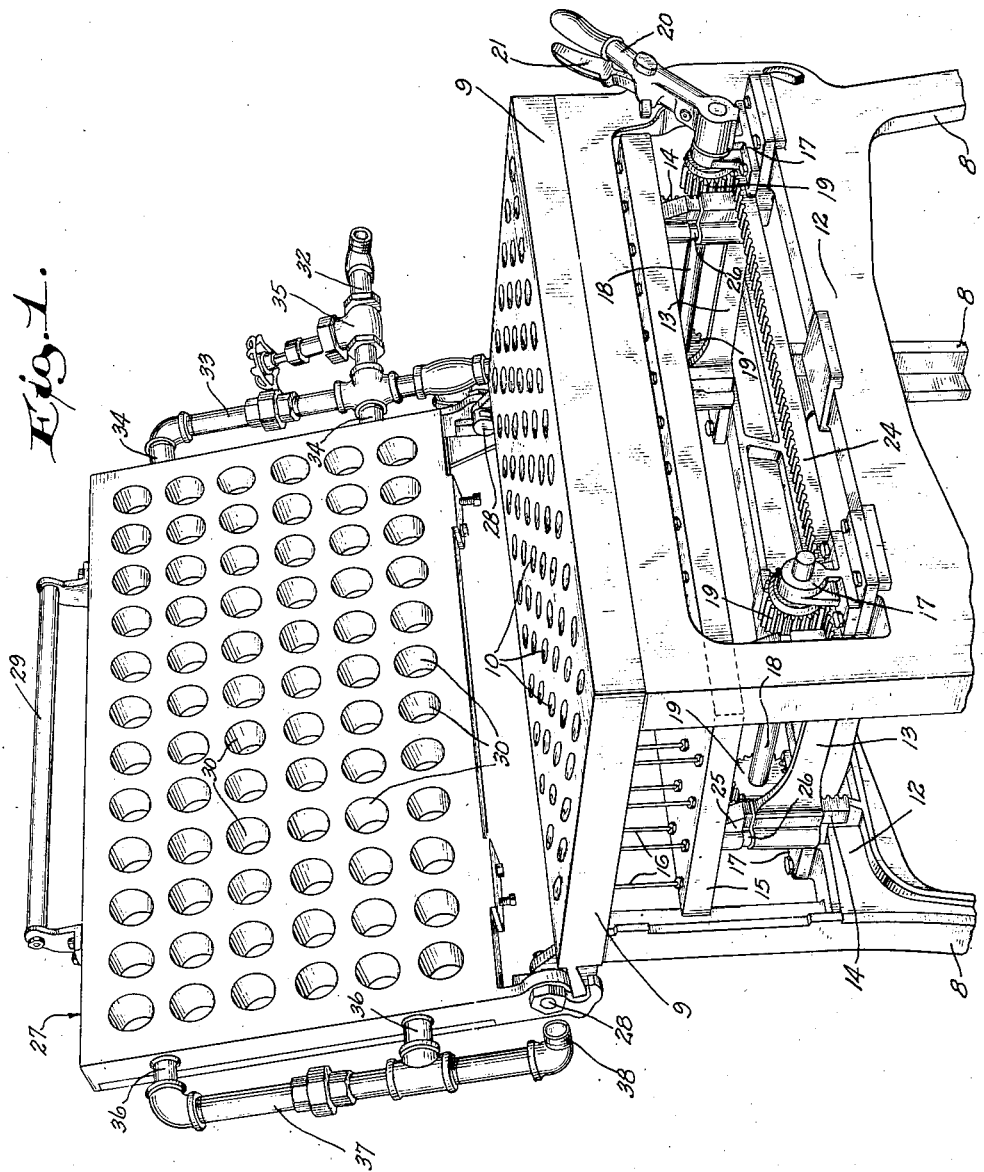
Fig. 1 is a fragmentary front and side perspective view of the improved candle molding apparatus with the top mold plate hinged to its opened position and with the pin carrying table in its lowered or retracted position.
Figure 2:
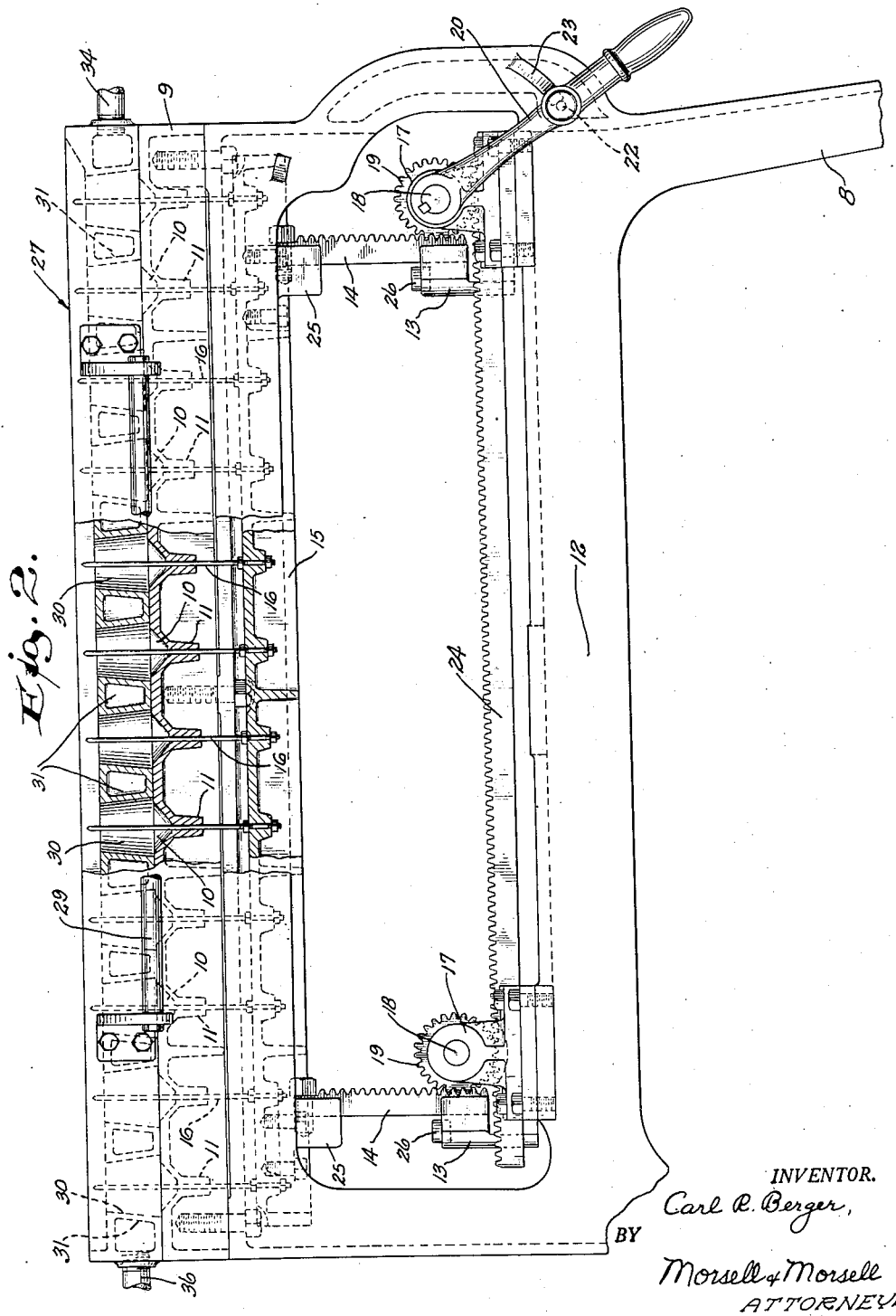
Fig. 2 is an enlarged fragmentary front view of the candle molding apparatus with parts broken away and in section to show structural details, the top mold plate being in its lowered or downfolded position and the pin table being in its elevated or projected position.
Figure 3:
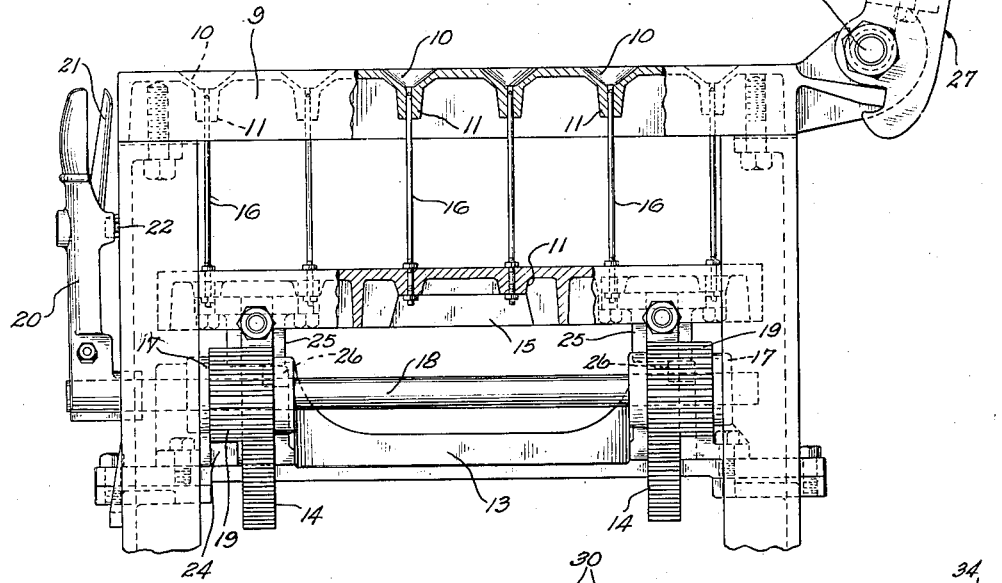
Fig. 3 is a fragmentary end view of the apparatus with the top mold plate open and the pin table lowered, parts being broken away and in section.
Figure 4:
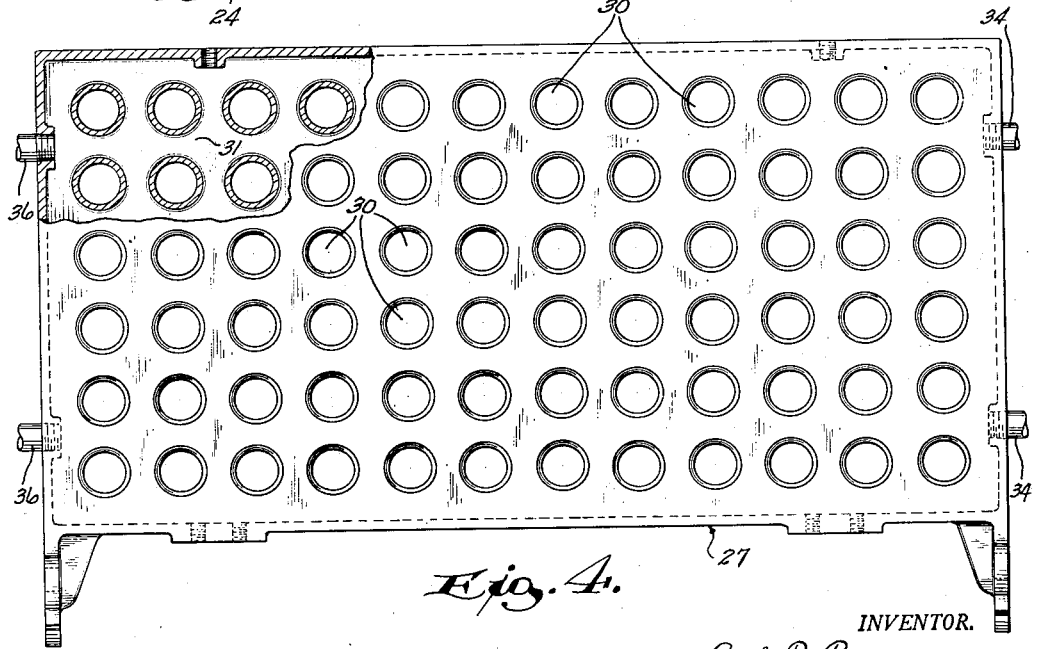
Fig. 4 is an enlarged inverted plan view of the top mold plate with a portion broken away and in section.

Referring now more particularly to Fig. 1 of the drawings, it will be observed that the candle molding apparatus is in the form of a massive metallic table having supporting legs 8 rigidly carrying on their upper ends a horizontal lower mold plate 9. In the mold plate 9, projecting downwardly from the top face thereof, as is best shown in Figs. 2 and 3, are a plurality of rows of substantially conical pockets or recesses 10 which ultimately form the upper tapered ends of the cast candles. Depending from the depressed mid-portion of each pocket 10 is a bored pin guiding boss 11.

As will be observed from Figs. 1, 2 and 3, the table, below its fixed mold plate 9, is in the form of an open frame work having front and rear longitudinal elements 12 which provide the supporting and mounting means for certain pin table operating elements which include spaced apart end transverse brackets 13. Each bracket 13 has its opposite ends enlarged and so formed as to vertically reciprocatably embrace rack bars 14, with the result that there is one rack bar adjacent each corner of the structure. The upper extremities of the rack bars are rigidly affixed to the lower surface portions of a horizontally disposed pin table 15 positioned below the bottom mold plate 9 for reciprocatory movement in a vertical direction within the frame work of the table structure. The details of the pin table 15 will be referred to more fully hereinafter, but it may be stated that it carries a plurality of elongated upwardly projecting pins 16 positioned to register with and to extend through the bores in the guiding bosses 11.

At the ends of the longitudinal frame elements 12, with each pair being transversely alined, are rigidly mounted bearing brackets 17 in which are journalled pinion shafts 18. Fast on each pinion shaft 18, adjacent the extremities thereof, are pinions 19. Each shaft-carried pair of pinions 19 is adapted to mesh with a pair of end rack bars 14.

The forward end of one of the pinion shafts 18 (as the right hand shaft in Figs. 1 and 2) carries fast thereon an operating handle 20 which, when manually engaged and moved, causes its shaft 18 to be turned in a desired direction. The operating handle 21 has associated therewith a yieldingly mounted grip portion 21 which controls a spring-urged detent 22 adapted to ride along a cam projection 23 and thus hold the operating handle 20 and its shaft 18 in any turned position of adjustment between the limits shown in Figs. 1 and 2. In order to transmit motion from the manually turned pinion shaft 18 to the other pinion shaft, a horizontal rack bar 24 is operatively mounted on the forward portion 12 of the frame. Hence, when the shaft 18 which carries the handle 20, is turned, through the forward pinion on said shaft engaging the rack bar 24 which also engages the forward pinion 19 on the other shaft 18, the last-mentioned shaft will be turned simultaneously with the first-mentioned shaft 18 and in the same direction. Thus, all four of the pinions 19 simultaneously engage their vertical rack bars 14 to raise or lower the same, depending upon the direction of movement imparted to the handle 20. This constitutes the simple manual means for effecting desired upward and downward reciprocations of the pin table 15 for the purpose of projecting or retracting the battery of pins 16 relative to the candle molds.

It will be noted from Figs. 2 and 3 that the upper ends of the rack bars 14 are set into downwardly projecting protuberances or bumpers 25 on the corner portions of the undersurface of the pin table 15. When the pin table 15 is in its lowermost position, as shown in Figs. 1 and 3, said bumpers 25 engage and are cushioned by yielding or resilient pads 26 mounted on the members 13.

An upper or cover mold plate is indicated generally by the numeral 27. Its rear or inner edge is provided with hinge projections whereby said plate 27 is hingedly connected to lugs on the rear of the mold plate 9, as at 28, adapting the top mold plate 27 for hinged movement from its opened, substantially vertical position of Fig. 1 to its closed position of Fig. 3. Along the front wall of the mold plate 27 there is affixed a handle 29 to facilitate raising and lowering the same.

Extending through the top mold plate 27 are a plurality of mold cavities 30 corresponding in position and number with the mold pockets 10 in the mold plate 9 and adapted to register therewith when the top mold plate 27 is in its downturned horizontal position of Fig. 2. As will best appear from Fig. 2, said mold cavities 30 are slightly upwardly or outwardly tapered and are adapted to form the shanks of the cast candles.

The top mold plate 27 is of jacketed construction to provide a plurality of intercommunicating fluid chambers 31 surrounding the mold cavities 30. As will appear from Fig. 1, fluid from a source is conducted by a supply pipe 32 to a header 33 which has connections 34 with the interior of the top mold plate 27 to permit fluid under pressure to be forced through the various chambers 31 and about the mold cavities 30. Fluid flow through the supply pipe 32 is controlled by a valve 35. For the exhaust of fluid from the interior of the top mold plate 27 there is provided on the other end of the member 27, in communication with the chambers 31, a pair of outlet stub pipes 36 communicating with a header 37, which connects with a discharge pipe 38 which may be extended to any desired point of fluid discharge.

In operating the improved candle molding apparatus, the top mold plate 27 is in its horizontal position of Fig. 2 and the pin table 15 is preferably in its lowered, pin retracted position. By means of the fluid inlet pipe 32, with the valve 35 opened, hot water or steam flows under pressure into the header 33 and through the connections 34 into the table chambers 31 surrounding the mold cavities 30. This serves to heat the molds and at any desired time, the heating fluid may be discharged through the connections 36, header 37 and outlet 38. Thereupon, it is necessary that the pin table 15 be in its elevated position so that all of the pins 16 extend centrally through the plurality of mold cavities 30—10, as is shown in Fig. 2. The molten material from which the candles are to be formed, is then poured into the mold cavities to fill the same. Thereafter, by means of the system of piping previously described, cold water is forced through the cavities 31 to cool the molds and the setting material therein. Following this step, the handle 20 is manipulated to lowed the pin table 15 to the position of Figs. 1 and 3 which serves to retract the pins 16 from the mold cavities and from the candles formed therein. The upper surface of the top mold plate 27 is next scraped to remove excess wax and thereafter a requisite amount of steam is passed through the pipes and chambers 31 to loosen the formed material in the molds. Next, the handle 20 is manipulated to again elevate the pin table 15 which functions to project the pins 16 through the bores in the formed candles, thereby cleaning and clearing the bores. Hinged movement of the top plate 27 from its horizontal position to its open upright position of Fig. 1 frees the same from the formed candles which remain seated in the pockets 10 in the lower mold plate 9. The pin table 15 is again lowered to the position of Fig. 1, entirely freeing the pins from the formed candles, whereupon the candles are manually removed from the mold plate 9. Subsequently, the cast candles have wicks inserted through the central bores formed therein by the pins 16. By virtue of the perfect formation of the candles in the improved apparatus, especially with respect to the wick bores, the operation of inserting the wicks is facilitated as the bores of the candles are clean and perfectly formed and are all centrally located. By providing an apparatus which permits the retraction of the pins 16 after the candles have been formed, removal of the candles from the mold is facilitated and it is not necessary to work or pry the same off of pins or to in any way damage, bend or deflect the pins.

The improved candle molding apparatus makes it possible to simultaneously produce a multiple number of candles very conveniently and expeditiously and the apparatus is additionally of novel construction and is well adapted for the purposes set forth.

What is claimed as the invention is:

1. In an apparatus for molding tapered candles, a molding table having a flat plate-like top forming a fixed mold section, said section having a plurality of shallow conical pockets therein, each tapering from its top surface downwardly, bored guide bosses depending from the lower surface of said section, each boss having its bore opening axially of a pocket thereadjacent and communicating therewith, a cover mold plate hingedly associated with the fixed mold section and having a plurality of elongated mold cavities therethrough, said sockets being adapted to register with and complement said conical pockets when the cover mold plate is in its normal covering position, an elevator platform mounted below the fixed mold section for movement to and from the latter, and a plurality of pins mounted on and projecting from the upper face of the platform, each pin being in registration with the axis of a conical pocket and being guidingly engaged by one of said bored bosses, up and down movement of the platform causing said pins to project into and retract from said pockets and mold cavities, movement of the cover mold plate away from the fixed mold section to its open position freeing and uncovering the major extents of tapered objects cast in said composite pockets and cavities.

2. In an apparatus for molding tapered candles, a molding table having a flat plate-like top forming a fixed mold section, said section having a plurality of shallow conical pockets therein, each of which tapers from its top surface downwardly, bored guide bosses depending from the lower surface of said section, each boss having its bore opening centrally into the lower tip of a pocket, a cover mold plate hingedly associated with the fixed mold section and having a plurality of elongated mold cavities therethrough, each cavity being of the shape of a truncated cone, said cavities being adapted to register with and complement said conical pockets when the cover mold plate is in its normal covering position, an elevator platform mounted below the fixed mold section for movement to and from the latter, and a plurality of pins mounted on and projecting from the upper face of the platform, each pin being at all times guidingly engaged by one of said bored bosses and maintained thereby in registration with the axis of a conical pocket, up and down movement of the platform causing said pins to project into and retract from said pockets and mold apertures.

3. In combination, a molding table having a flat plate-like top forming a fixed mold section, said section having a plurality of shallow conical pockets therein, each tapering from its top surface downwardly, bored guide bosses depending from the lower surface of said section, each boss having its bore opening centrally into the lower tip of a pocket, an open framework supporting structure on which said fixed mold section is mounted, a cover mold plate hingedly associated with the fixed mold section and having a plurality of elongated cavities therethrough, said cavities being of the shape of truncated cones, said cavities being adapted to register with and complement said conical pockets when the cover mold is in its normal covering position, said cover mold plate being formed with a fluid chamber to permit circulation of a heat exchange fluid adjacent said cavities, an elevator platform mounted within the open supporting structure and below the fixed mold section, manually operated rack and pinion means carried by said supporting structure and connected to the corners of said elevator platform for raising and lowering said platform, said platform being maintained by said raising and lowering means in a plane parallel to that of the top of said fixed mold section, and a plurality of pins mounted on and projecting from the upper face of the platform, each pin being at all times guidingly engaged by one of said bored bosses and maintained in registration with the axis of a conical pocket, raising and lowering movement of the platform causing said pins to project into and retract from said pockets and mold cavities, movement of the cover mold plate away from the fixed mold section freeing and uncovering the major extents of tapered objects cast in said composite pockets and cavities.

CARL R. BERGER.

REFERENCES CITED

The following references are of record in the file of this patent:

UNITED STATES PATENTS

| Number | Name | Date |
| --- | --- | --- |
| 86,059 | Cowles | Jan. 19, 1869 |
| 315,172 | Schreck | Apr. 7, 1885 |
| 350,048 | Du Pont | Sept. 28, 1886 |
| 1,390,257 | Dillman | Sept. 6, 1921 |
| 1,775,812 | Church | Sept. 16, 1930 |
| 1,786,634 | Sgritta | Dec. 30, 1930 |
| 2,298,913 | Arden et al. | Oct. 13, 1942 |
| 2,403,948 | Purinton | July 16, 1946 |